Jan. 25, 1966 R. E. FRINK 3,231,666
TERMINAL BUSHING FOR GROUND FLANGE MOUNTING HAVING A CORONA
REDUCING ELECTROSTATIC SHIELD BETWEEN THE FLANGE
AND THE CONDUCTOR
Filed Sept. 12, 1962 6 Sheets-Sheet 1

WITNESSES
John V. Healy, Jr.
James F. Young

INVENTOR
Russell E. Frink
BY
Willard R. Crout
ATTORNEY

Jan. 25, 1966 R. E. FRINK 3,231,666
TERMINAL BUSHING FOR GROUND FLANGE MOUNTING HAVING A CORONA
REDUCING ELECTROSTATIC SHIELD BETWEEN THE FLANGE
AND THE CONDUCTOR
Filed Sept. 12, 1962 6 Sheets-Sheet 6

3,231,666

TERMINAL BUSHING FOR GROUND FLANGE MOUNTING HAVING A CORONA REDUCING ELECTROSTATIC SHIELD BETWEEN THE FLANGE AND THE CONDUCTOR

Russell E. Frink, Pittsburgh, Pa., assignor to Westinghouse Electric Corporation, Pittsburgh, Pa., a corporation of Pennsylvania Filed Sept. 12, 1962, Ser. No. 223,082
3 Claims. (Cl. 174—142)

This invention relates to terminal-bushing constructions in general and, more particularly, to terminal-bushing constructions utilizing generally a unitarily-constructed solid dielectric material for the terminal-bushing body.

A general object of the present invention is the provision of an improved, simplified and economically-manufactured terminal bushing suitable for application over a wide range of current and voltage values.

A more specific object of the present invention is the provision of an improved terminal bushing utilizing improved and highly-effective mounting-flange supporting means.

Still another object of the invention is the provision of an improved terminal-bushing construction utilizing improved electrostatic shielding means for preventing high-voltage electrostatic stresses adjacent the grounded mounting flange means.

Another object of the present invention is the provision of an improved terminal-bushing construction in which, generally, the entire electrostatic voltage stress is imposed upon the solid dielectric material interposed between the grounded mounting-flange means and the internally-disposed conductor stud in the absence of any film of air therebetween, which would be conducive to corona formation.

Still another object of the present invention is the provision of an improved terminal bushing preferably made from a ceramic material, such as porcelain, suitably configured to provide undercut recesses adjacent the mid-portion thereof to assist in grading the electrostatic voltage stress adjacent the grounded mounting-flange means.

Still a further object of the present invention is the provision of an improved terminal-bushing construction in which the manufacturing processes may be expedited, and also a rigid and highly-effective mounting means may be provided.

Yet a further object of the present invention is the provision of an improved terminal-bushing construction in which a suitably-cast metal, such as a suitable Babbitt metal, may be provided in the annular space between the longitudinally-extending terminal stud and the inner bore of the insulator body.

An additional object of the present invention is the provision of an improved dielectric body for a terminal bushing in which metallized surface layers are provided at suitable strategic locations so as to minimize any electrostatic voltage stresses formed during the operation of the bushing, and also to impose generally the entire voltage stress through the solid dielectric material of the bushing body to the exclusion of any interposed air films.

Yet a further object of the present invention is the provision of improved mounting arrangements for terminal-bushing constructions.

An ancillary object of the invention is to provide an improved electrostatic shield construction for the end of a terminal bushing.

Yet a further object of the invention is to provide an improved terminal bushing utilizing metallized surface layers for controlling the electrostatic stress conditions imposed upon the dielectric body of the terminal bushing during the operation thereof.

Additional objects and advantages will readily become apparent upon reading the following specification, taken in conjunction with the drawings, in which.

Figure 14:
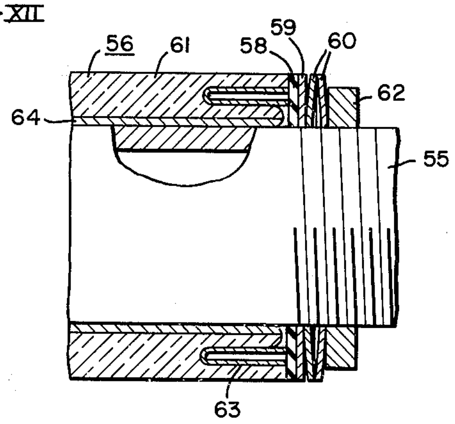
Figure 15:
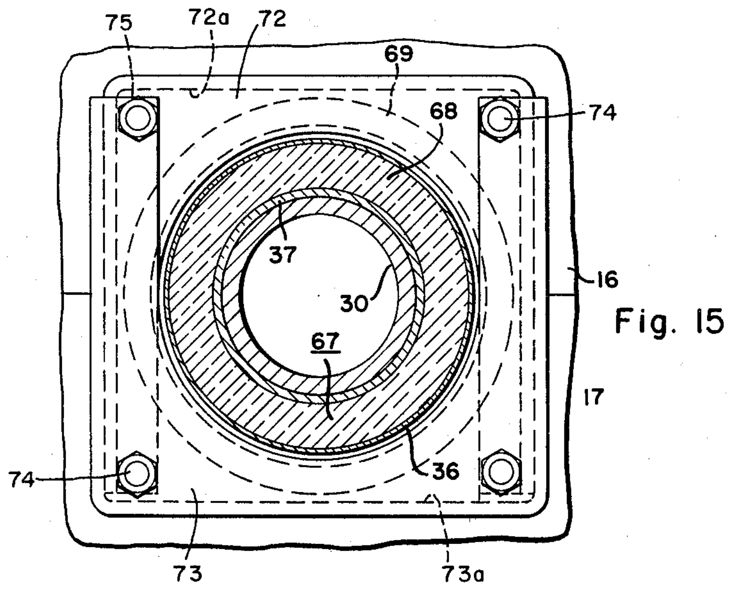
Figure 16:
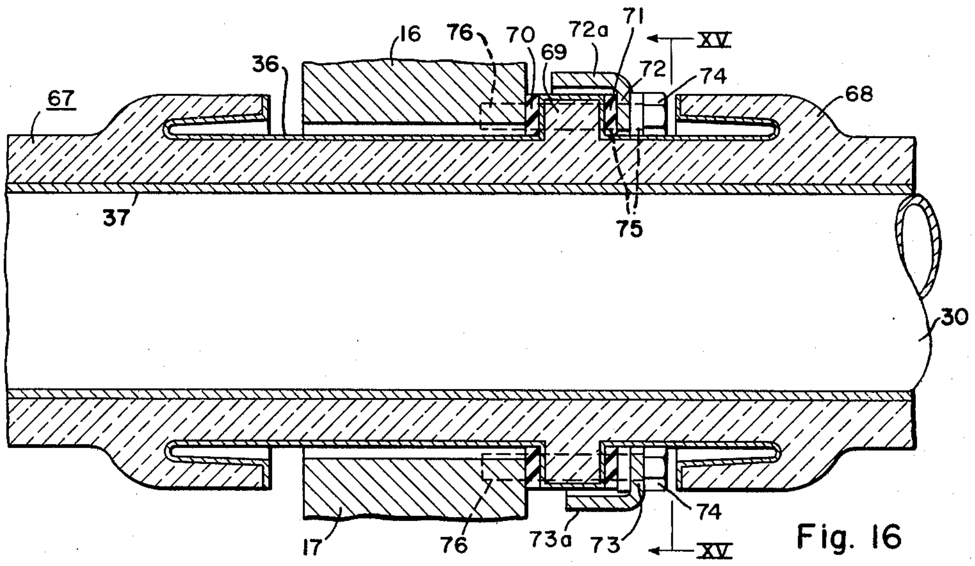

FIG. 14 fragmentarily illustrates a modified type of construction for the end of a terminal bushing; and, FIGS. 15 and 16 illustrate a further type of mounting flange supporting means, with FIG. 15 being a sectional view taken substantially along the line XV—XV of FIG. 16.

There has been in recent years a pronounced preference on the part of electrical utility users for the use of porcelain as an insulating material wherever its use is possible. When a porcelain bushing is used to carry high voltage through a grounded member, such as a circuit-breaker tank, or a transformer tank, very high voltage gradients exist close to the grounded member. This causes corona at lower than the required voltage level, and the flashover and basic-impulse-level requirements cannot be met. Heretofore, the use of porcelain in terminal-bushing constructions has been accompanied by distinct disadvantages in an improper gradation of the electrostatic stress conditions resulting from improper design. I have discovered that by suitably configuring the dielectric body of a terminal bushing, which may be made of a suitable ceramic material, such as porcelain, glass, or another dielectric material, such as resin, etc. and utilizing either a suitable casting metal, such as Babbitt metal, or, alternatively, metallized layers, resulting improved electrostatic voltage stress conditions have been achieved to render thereby the application of the bushing possible throughout a wide range of current and voltage conditions. Particularly effective results are obtained by the use of a cheap insulating material, such as porcelain.

Figure 1:
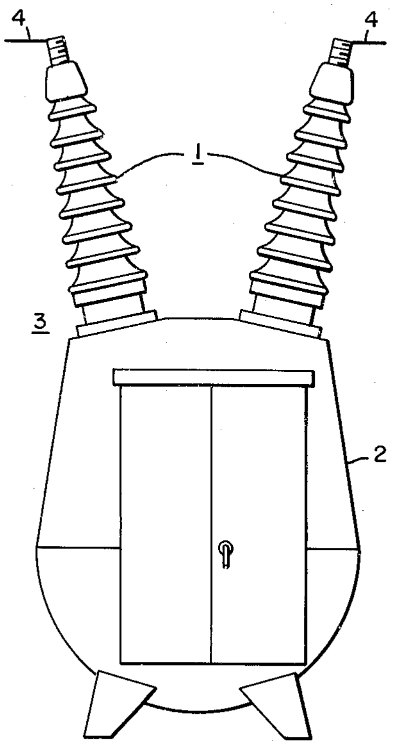
FIG. 1 is a side elevational view of a high-voltage oil-type circuit interrupter utilizing high-voltage terminal bushings constructed according to the features of the present invention.

As well known by those skilled in the art, terminal bushings are widely used throughout the electrical industry in circuit-interrupter tank arrangements, transformer-tank constructions, and lower-voltage magnetic air-type breakers. FIG. 1 illustrates a possible application of a high-voltage terminal bushing 1 to a tank structure 2 enclosing a suitable circuit-interrupting structure. Reference may be had to U.S. Friedrich Patent 2,816,991 for a detailed description of such a circuit-interrupting structure. It is to be noted that with the application of the terminal bushings 1 to the circuit interrupter 3, they are subjected to lateral stresses as imposed by line conductors 4, which may assume bus form, and also are additionally subjected to weathering and high-voltage stress conditions when the circuit interrupter 3 is applied on high-voltage service. A transformer tank application would encounter similar conditions.

Figure 2:
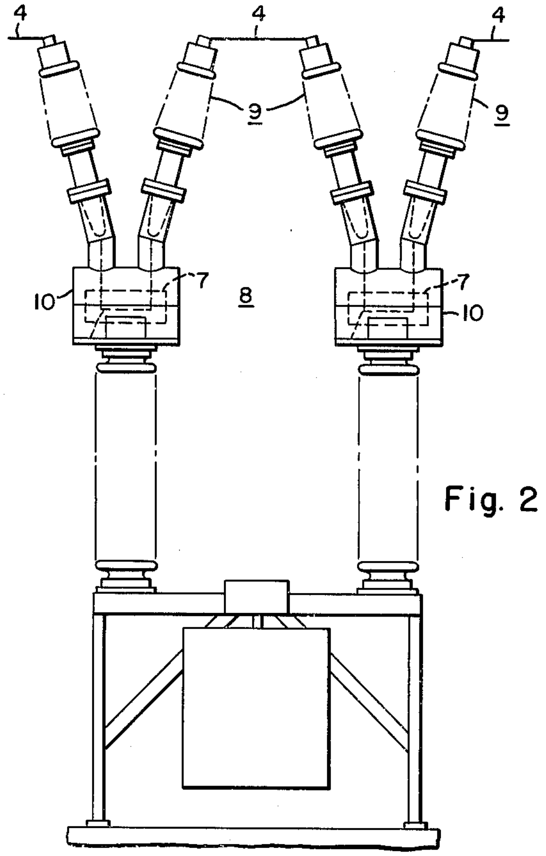
FIG. 2 illustrates an application of the principles of the present invention as applied to the terminal bushings applied to a circuit interrupter of the "live" tank type, in which the terminal bushings extend into enclosing tank structures which are disposed at high potential during normal operation of the breaker.

The "live" type of circuit-interrupting construction 8, pictured in FIG. 2, illustrates the mechanical and high-voltage stress conditions imposed upon terminal bushings 9 when utilized in such a construction. It will be observed that during the opening operation, upon opening of the serially-related pair of interrupting units 7 disposed within the high-voltage tanks 10, the capacitance effects achieved interiorly within the terminal bushings 9 assist in grading the voltage to be imposed across the interiorly-disposed interrupting units 7 during the opening operation. Additionally, severe mechanical stresses are encountered in the constructional employment of the bushings 9 in such an interrupting arrangement.

Figure 3:
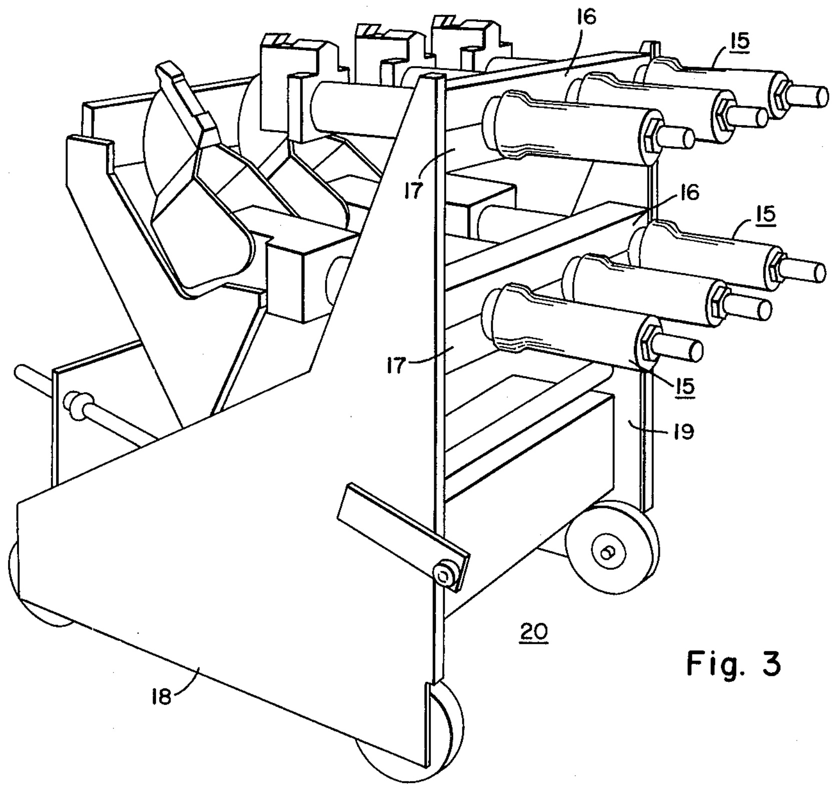
FIG. 3 illustrates, fragmentarily, in perspective an application of a form of the novel terminal-bushing construction of the present invention as applied to a relatively low-voltage magnetic-type air-break circuit interrupter, the arc-chute structures being omitted for purposes of clarity.

FIG. 3 illustrates a further application of a terminal bushing constructed in accordance with the teachings of the present invention to a relatively low-voltage magnetic air-type circuit interrupter, say, for example, of the 15 kv. rating, with the arc-chute structures omitted for purposes of clarity. In the particular arrangement illustrated in FIG. 3 it will be observed that the bushing structures 15 are clamped into position between a pair of cooperating cross-bars 16, 17 secured to side frame members 18, 19. As well known by those skilled in the art, such circuit-interrupting structures 20 carry considerable current, especially during the interruption of fault magnitude currents, and impose exceedingly high mechanical stress conditions upon the terminal bushings 15.

It is, of course, obvious that a desirable objective in the terminal-bushing industry is to achieve high mechanical strength and resistance to electrical breakdown conditions by utilizing a relatively cheap material, such as porcelain, suitably configured in a manner so as to maximize its voltage-stress withstanding ability.

Figure 4:
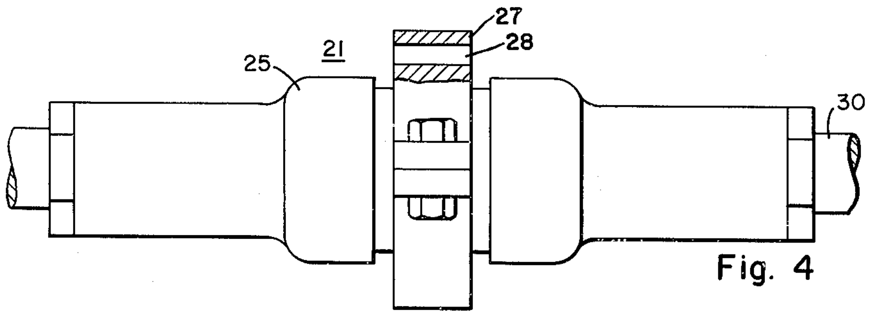
FIG. 4 is a side elevational view of a terminal bushing constructed in accordance with the principles of the present invention.
Figure 5:
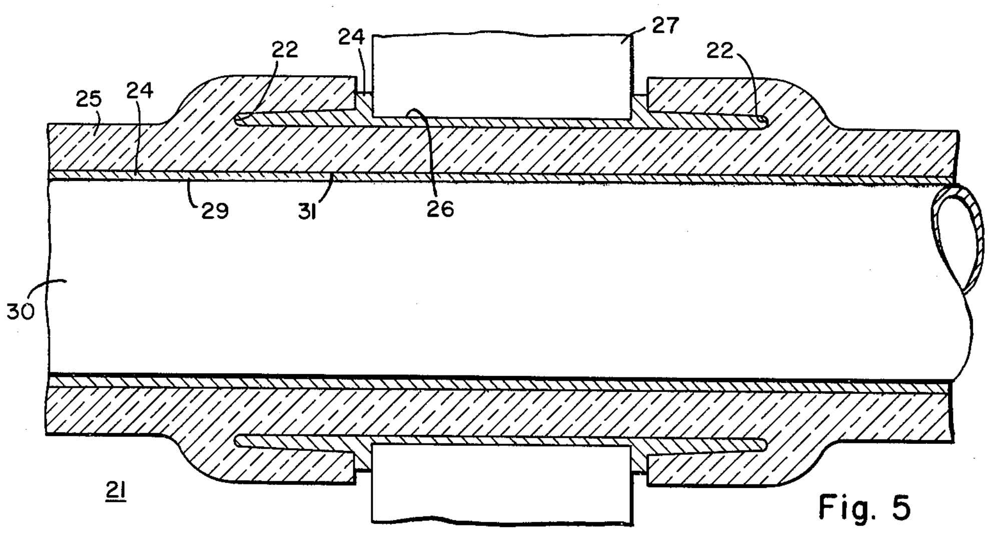
FIG. 5 is a fragmentary enlarged longitudinal sectional view taken through the terminal bushing of FIG. 4 to show the construction thereof in more detail.

With reference to FIG. 5 of the drawings, it will be noted that there is illustrated a cross-sectional view taken through a terminal bushing 21 preferable composed of porcelain. FIG. 4 shows a side view of such a bushing 21. Particularly advantageous results have been achieved by utilizing a suitable porcelain body having a relatively high alumina content. One example of a formulation for such an alumina porcelain body is that set forth below:

*Alumina porcelain body*

| | Percent |
|---|---|
| Calcined alumina | 45 |
| Clay | 32 |
| Feldspar | 23 |

Another example of a formulation for a regular-type porcelain body is as follows:

*Porcelain body*

| | Percent |
|---|---|
| Feldspar | 32 |
| Flint | 18 |
| Clay | 50 |

Although highly advantageous results have been achieved by the use of the foregoing formulations, additional formulations are set forth in United States Baker et al. Patent 2,454,121, Rowland Patent 2,157,100 and Rowland Patent 2,437,559.

Although I particularly prefer to utilize a relatively cheap ceramic material, such as porcelain, with its well-proven desirable weathering characteristic and high dielectric strength, nevertheless it will be obvious to those skilled in the art that certain features of the present invention, namely the particular configuration of the insulator body parts, as more particularly described hereinafter, are suitable for use with other dielectric materials than ceramic materials, such as porcelain. For example, the dielectric body may be composed of a suitable resinous material, such as set forth in U.S. Black Patent 3,001,004, Sonnenberg Patent 3,001,005, Herman Patent 2,961,518, Kessel et al. Patent 2,997,527, Kessel et al. Patent 2,997,528 and in United States Patent application filed April 20, 1961, Serial No. 104,339, by Louis Sauer, and assigned to the assignee of the instant application. Additionally, the dielectric body may assume the form of a butyl rubber material, such as set forth in United States Kessel et al. Patent 2,997,526.

With reference to FIG. 5 of the drawings, it will be observed that the porcelain body 25 has formed therein a pair of oppositely-extending undercut grooves 22, into which, following the usual firing operation in a kiln, Babbitt metal 24, or like conducting material may be positioned. Reference may be had to the 1961 (eights) edition of Metals Handbook, page 1066 for typical casting babbitt alloys. Preferably a machined mounting recess 26 is provided to seat a split mounting flange 27, the form of which is more clearly shown in FIG. 4 of the drawings. The mounting flange 27 is preferably provided with a pluarality of suitable mounting holes 28 for use in mounting the terminal bushing 21 over a wide variety of current and voltage applications.

To ensure that the electrostatic voltage stress conditions will be imposed substantially entirely within the dielectric body 25 and to prevent the existence of an air film in series with the dielectric body, preferably additional Babbitt metal 24 is positioned within the annular clearance space 29 between the terminal stud 30 and the bore 31 of the dielectric body 25. The interposition of the Babbitt metal 24 ensures that the equipotential boundary will be at the inner side of the bore 31 so that the voltage stress between the high-voltage conductor 30 and the grounded flange 27 will be imposed substantially entirely upon the dielectric body 25 and no voltage gradient will exist between the inner wall of the insulator 25 and the stud 30. If an air gap exists in this area and no shielding means is employed, the gradient will be sufficiently high to break down the air, and resulting ionization will eventually destroy the insultating material, as well as to cause radio interference beyond permissible levels.

As well known in the art, the imposition of voltage stress in a series capacitance circuit with different s.i.c.

materials varies inversely as the s.i.c. of the insulating material. As a result, a material, such as air, having an s.i.c. of 1 would assume more voltage stress than solid insulation having a higher s.i.c. value. The avoidance of an air film adjacent to the terminal stud or to the grounded mounting parts is, therefore, desirable.

Figure 7:
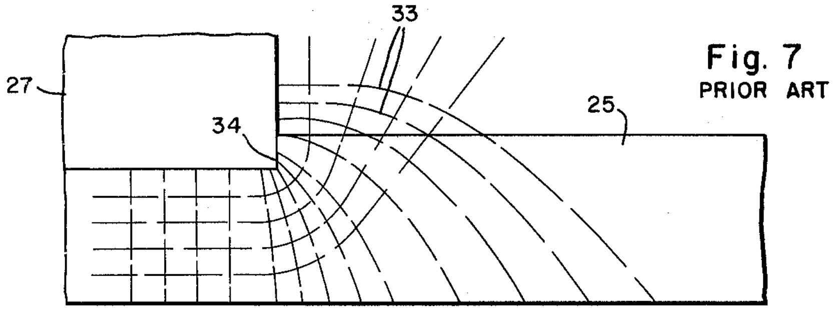
Fig. 7 PRIOR ART
FIG. 7 is a fragmentary diagrammatic view illustrating the electrostatic stress conditions existing in a terminal bushing body not constructed in accordance with the teachings of the present invention.
Figure 8:
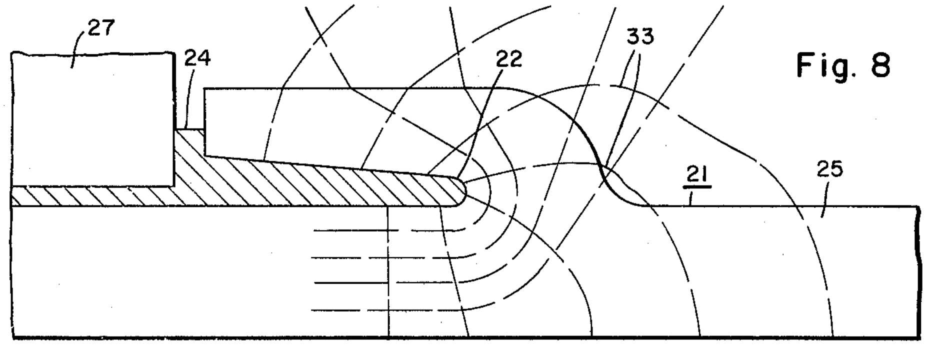
FIG. 8 is a diagrammatic view, similar to that of FIG. 7, and illustrating the improved electrostatic stress conditions existing by an application of the principles of the present invention.

FIGS. 7 and 8 illustrate diagrammatically the improved electrostatic stress conditions resulting from the use of the particular dielectric body configuration described. The electrostatic flux lines 33 illustrate the electrical field direction and their concentration, as well known by those skilled in the art, is an indication of the voltage gradient conditions imposed upon the dielectric body 25. It will be evident that with respect to FIG. 7, there exists a high-voltage gradient at the point 34, whereas with reference to FIG. 8, the utilization of an undercut recess 22, together with the Babbit metal 24 (or a metallized layer hereinafter described) will assist in minimizing the voltage stress conditions existing within the dielectric body 25.

Figure 9:
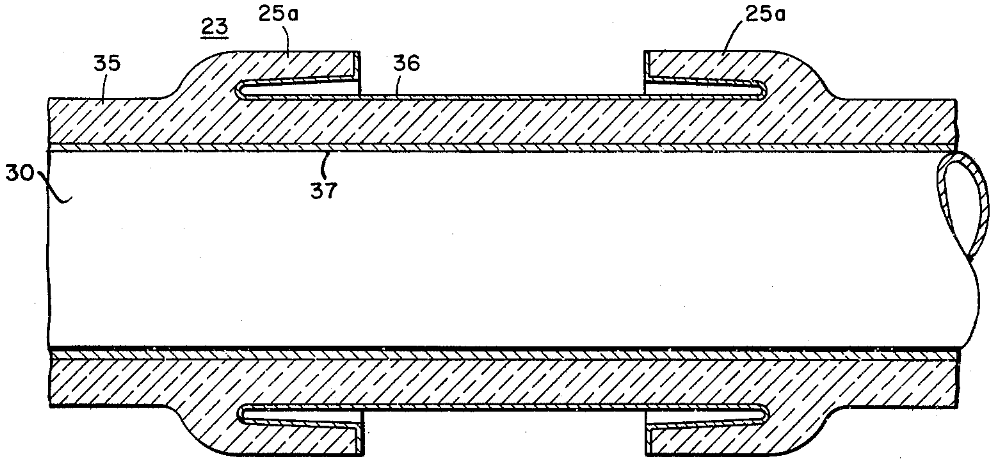
FIG. 9 is a three-quarter sectional view taken longitudinally through a terminal-bushing dielectric body configured in accordance with the teachings of the present invention, and utilizing metallized layers so disposed as to reduce the electrostatic stress conditions imposed upon the dielectric body of the bushing.

The modified dielectric body 35, pictured in FIG. 9, illustrates an application of the invention utilizing metallized surface layers 36, 37 in place of the previously mentioned Babbitt metal 24. Again it will be observed that the end result of utilizing such metallic layers is to impose substantially the entire electrostatic voltage stress interiorly of result of utilizing such metallic layers is to impose substntially the entire electrostatic voltage stress interiorly of the porcelain body 35 and not to permit a high-voltage stress condition to exist in the air space 23 externally of the layers 36, 37. The reference characters 25*a* in FIG. 9 indicate the opposed inwardly-extending integral portions of the dielectric body 35 defining the recesses or grooves 22.

The metallic layers 36, 37 may be obtained by spraying or brushing a suitable conducting layer upon the "green" porcelain body prior to the firing operation. One such material, supplied by O. Hommel Co. of Pittsburgh, Pa. under their designation "Silver Paste AB" has proved very suitable. It comprises a suspension of silver particles, or powder in an organic binder with a glass fluxing agent. During the kiln firing operation, the organic binder evaporates and the glass flux serves as a binder to cause rigid adherence of the silver particles to the base porcelain body 35. A conducting coating of silver results. Other conducting coatings may be employed. Reference may be had to U.S. Hunt Patent 1,973,076, Hunt et al. Patent 1,987,683, Smede et al. Patent 1,852,093 or U.S. Patents 2,386,095 or 2,042,208 for alternate coating materials.

As an indication of the important commercial possibilities and of excellent experimental results, attention is directed to FIG. 9 of the drawings. Such a porcelain body was constructed using a alumina porcelain as per the first formulation given above. The bushing was designed for a 3000 amp., 15 kv. bushing suitable for use with a 1000 mva. breaker of the type shown in FIG. 3. The bushing body 35 was 22¼ inches long, 4⅛ inch I.D. by 5⅝ inch O.D. (exclusive of the shields 25*a*). The metallized surfaces were fired-on silver with Silver Paste AB supplied by O. Hommel Co., having a thickness of about .001 inch. Such bushings had a 60 cycle flashover of between 60 and 65 kv., and passed a 1 minute withstand of 50 kv. A rough radio interference test showed a corona start voltage of 14.5 kv. with a 50 micro-volt radio interference level as 16 kv. Standards for this class of equipment require a 36 kv. 1 minute withstand and an R.I.V. level of not more than 500 micro-volts at 9.1 kv. The outstanding performance of such bushings is, consequently, evident.

Figure 10:
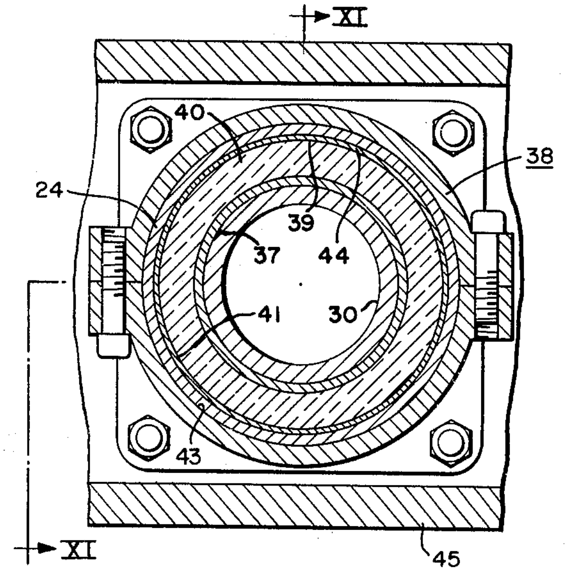
FIG. 10 is a fragmentary transverse sectional view of a modified type of ground-flange construction taken substantially along the line X—X of FIG. 11.
Figure 11:
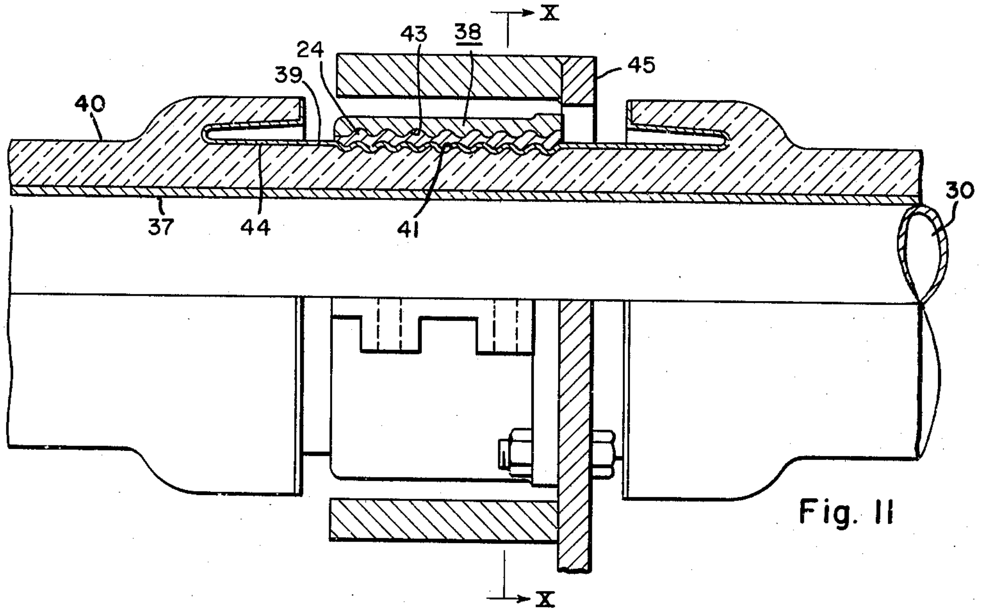
FIG. 11 is a fragmentary longitudinal sectional view taken substantially along the line XI—XI of FIG. 10 illustrating the modified ground-flange arrangement of FIG. 10.

FIGS. 10 and 11 illustrate a modified type of mounting arrangement suitable for use with the relatively low-volt age circuit-interrupter structure of FIG. 3. In this arrangement a split flange 38 is bolted around the recessed portion 39 of the bushing 40 and is anchored in place by a layer of babbitt 24. The surface 41 of the bushing

40 and the interior 43 of the flange 38 are corrugated in the area of the babbitt 24 to provide mechanical keying. The babbitt 24 makes an electrical connection between the metallized surface 44 of the bushing 40 and the split flange 38. The terminal bushing 40 is attached to the metallic mounting plate 45 which is grounded.

Figure 12:
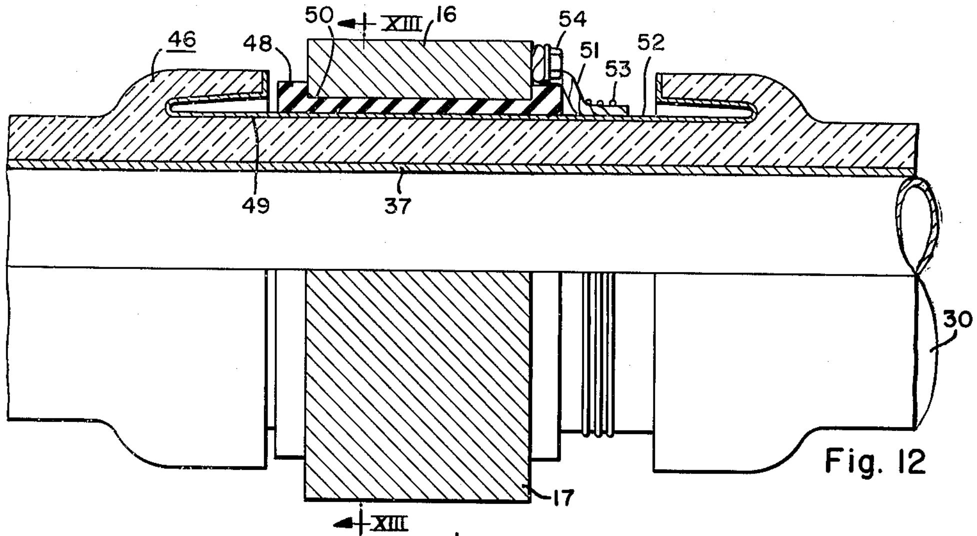
FIG. 12 is a fragmentary longitudinal sectional view taken through another modified type of grounded mounting-flange arrangement, the view being taken substantially along the line XII—XII of FIG. 13.
Figure 13:
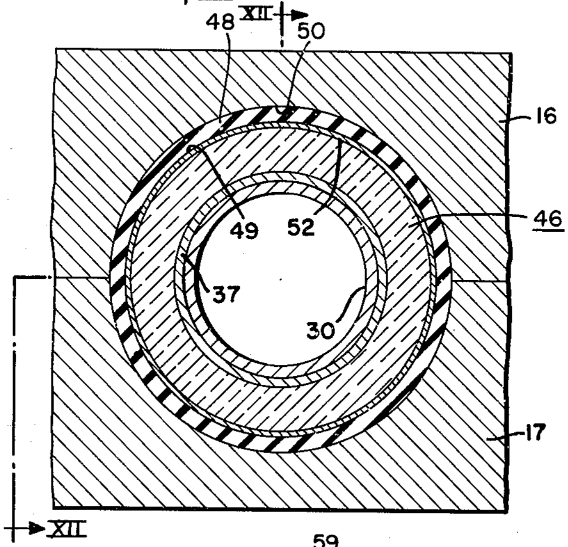
FIG. 13 is a fragmentary transverse sectional view taken substantially along the line XIII—XIII of FIG. 12, illustrating the modified grounded mounting-flange arrangement of FIG. 12.

An alternate mounting arrangement is shown in FIGS. 12 and 13. In this arrangement the bushing 46 is clamped between horizontal clamp bars 16, 17, which are attached to a breaker frame 18 (FIG. 3). Each pair of bars 16, 17 accommodates three bushings 46, as shown, for example, in FIG. 3. The porcelain bushing 46 has a mounting band 48 made up of glass tape and epoxy resin, which is wound over the central section 49 and cured. After the bushing 46 is assembled, a mounting groove 50 is cut in the band 48 and the bushing is clamped between the clamp bars 16, 17. A pigtail 51 is connected to the metallized surface 52 of the bushing 46 by banding wires 53 and is bolted to the upper clamp bar 16 by bolt 54. This provides a ground for the outer metallized surface 52 of the bushing.

Figure 6:
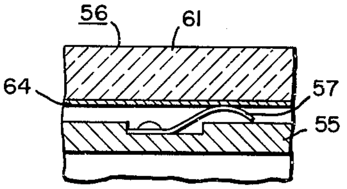
FIG. 6 is a fragmentary detail view illustrating a modification of the construction of FIGS. 4 and 5.

FIG. 14 shows the utilization of a tubular stud 55 which goes through the bushing 56 and is connected to the inner metallized surface 64 of the bushing by any suitable means, such as spring clips 57 (FIG. 6). A resilient washer 58 bears against the end of the bushing. A metallic washer 59 bears against the resilient washer 58. A pair of opposing Bellville washers 60 bear against the metallic washer 59 to provide for differential longitudinal temperature expansion between the porcelain body 61 and the copper parts, and the assembly is held together by the nut 62. A recess 63 may be cut in the end of the bushing 56 and the metallized inner coating 64 carried up over the end and lining this recess. This will have a similar effect to the recesses 22 (FIG. 5) in the central portion of the bushing and will result in a still higher flashover level.

FIGS. 15 and 16 shows an alternate mounting arrangement for a terminal bushing of the type under consideration. It will be noted that the modified-type terminal bushing 67 has a bushing body 68 with a radially protruding annular flange 69. Resilient gaskets 70, 71 are interposed between support bars 16, 17 and a pair of telescoping U-shaped clamps 72, 73 with peripheral supporting flanges 72*a*, 73*a*.

Clamping bolts 74 extend through four aligned mounting apertures 75 in the U-shaped clamps 72, 73 and thread into tapped apertures 76 provided in the mounting bars 16, 17. Compressive force is hence exerted upon the peripheral flange 69 to support the bushing body 68 into operative position.

From the foregoing description it will be apparent that there is provided an improved terminal-bushing construction adaptable over a wide range of voltage and current values, and perferably provided from a solid dielectric material, such as porcelain. The utilization of the cast babbitt 24 or the metallized surface layers 36, 37 imposes substantially all of the voltage stress within the interior body of the porcelain, and permits a simplification of the entire bushing. Various flange mounting arrangements may be employed, as illustrated in FIGS. 10-13 of the drawings. The result is a strong and rigid terminal-bushing construction suitable for withstanding cantilever stresses and adaptable for small size by virtue of the improved voltage stress conditions achieved.

Although the invention has particularly desirable features as applied to a unitary dielectric body, nevertheless the undercut construction 22 may be applied to higher voltage bushing ratings, involving, for example, embedded capacitance layers. Such an application will be obvious to those skilled in the art, and reference may be had to the laminated construction of Lapp Patent 2,953,629 in this connection, with the external mid-portion of the bushing having a configuration and mounting flange arrangement as per the instant application.

Although there have been illustrated and described specific structures, it is to be clearly understood that the same were merely for the purpose of illustration, and that changes and modifications may readily be made therein by those skilled in the art, without departing from the spirit and scope of the invention.

I claim as my invention:

1. In combination, a terminal bushing having a body portion, said body portion having a pair of oppositely-extending under-cut recesses adjacent the mid-portion thereof, conducting means disposed adjacent ends of said oppositely-extending under-cut recesses to form electrostatic shielding means, a radially outwardly extending supporting flange portion integrally formed with the bushing body and disposed between said under-cut recesses, and clamping mounting flange means including resilient rings associated with said supporting flange portion and disposed on opposite sides thereof.

2. In combination, a terminal bushing including an elongated rod-like conductor stud and an enveloping sleeve-like bushing body composed of a dielectric material and having a bore therethrough, said stud passing through said bore, a predetermined length of the wall of the bore of the bushing having a layer of conductive material over the entire area thereof, the conductor stud making electrical connection with the layer of conductive material on the wall of the bore, a predetermined mounting portion of the external surface of the bushing body adjacent the layer of conductive material in the bore being adapted to be mounted in a conductive mounting flange maintained at a potential difference with respect to the conductor stud, the external surface of the bushing body having two portions of enlarged outer diameter one on each side of said mounting portion, said mounting portion being cylindrical and substantially coaxial with the bore, the two portions of enlarged outer diameter of the bushing body having oppositely extending annular undercut recesses therein, a radially outwardly extending supporting flange portion integrally formed with the bushing body and disposed between said undercut recesses therein, a radially outwardly extending supporting flange portion integrally formed with the bushing body and disposed between said undercut recesses, means providing a conducting surface layer covering the surface of the mounting portion and the entire wall surfaces of the recesses to form a continuous annular electrostatic shield, the annular bottoms of the recesses being rounded, resilient rings on each side of said flange portion, said flange portion being separated from said mounting flange by one of said resilient rings, means for clamping the resilient rings, flange portion and flange together, and means providing electrical connection between the electrostatic shield and the conductive mounting flange, the electrostatic shield and the layer of conductive material on the wall of the bore of the bushing providing that the electrostatic field resulting from the potential difference between the conductor stud and the mounting flange is set up wholly in the dielectric material of the bushing body and providing that no large gradient exists in said electrostatic field.

3. In combination, a terminal bushing including an elongated rod-like conductor stud and enveloping sleeve-like bushing body means composed of a dielectric material and having a bore therethrough, a layer of conductive material on the wall of the bore, said stud passing through said bore, the stud being electrically connected to the layer of conductive material, a predetermined mounting portion of the external surface of the bushing body adjacent the layer of conductive material in the bore in the bushing being adapted to be mounted in a conductive mounting flange maintained at a potential difference with respect to the conductor stud, the external surface of the bushing body having two portions of enlarged outer diameter one on each side of said mounting portion, said mounting portion being cylindrical and substantially coaxial with the stud in the bushing, the two portions of enlarged outer diameter of the bushing body having oppositely extending annular undercut recesses therein, a radially outwardly extending supporting flange portion integrally formed with the bushing body and disposed between said undercut recesses, means providing a conducting surface layer covering the surface of the mounting portion and the entire wall surfaces of the recesses to form a continuous annular electrostatic shield, the annular bottoms of the recesses being rounded, and means including resilient means clamping the flange portion to the mounting flange and making electrical connection between the electrostatic shield and the conductive mounting flange, the layer of conductive material in the bore in the bushing together with the electrostatic shield providing that the electrostatic field resulting from the potential difference between the mounting flange and the conductor stud is substantially uniform without sharp gradients therein.

References Cited by the Examiner

UNITED STATES PATENTS

| | | | |
|---|---|---|---|
| 1,173,994 | 2/1916 | Barfoed | 174—184 |
| 1,697,832 | 1/1929 | Jansson | 174—142 X |
| 1,730,136 | 10/1929 | Haller | 174—142 |
| 2,318,922 | 5/1943 | Carington | 313—11 X |
| 3,052,824 | 9/1962 | Ten Haken et al. | 174—152 X |
| 3,086,075 | 4/1963 | Gard | 174—152 |
| 3,094,585 | 6/1963 | Rudner | 174—152 X |

FOREIGN PATENTS

| | | |
|---|---|---|
| 1500/31 | 2/1932 | Australia. |
| 666,881 | 5/1929 | France. |
| 1,017,608 | 9/1952 | France. |
| 303,690 | 2/1918 | Germany. |
| 373,056 | 4/1923 | Germany. |
| 955,792 | 1/1957 | Germany. |
| 5,511 | 1915 | Great Britain. |
| 158,932 | 2/1921 | Great Britain. |
| 307,647 | 3/1929 | Great Britain. |
| 430,076 | 6/1935 | Great Britain. |
| 871,116 | 6/1961 | Great Britain. |
| 304,511 | 3/1955 | Switzerland. |
| 320,903 | 5/1957 | Switzerland. |

JOHN F. BURNS, *Primary Examiner.*

JOHN P. WILDMAN, LARAMIE E. ASKIN, *Examiners.*